United States Patent [19]
Tsubono et al.

[11] Patent Number: 5,940,181
[45] Date of Patent: Aug. 17, 1999

[54] MEASURING METHOD AND MEASURING APPARATUS

[75] Inventors: Issei Tsubono; Fujio Makita, both of Utsunomiya; Hirofumi Nakanishi, Takanezawa-machi; Yasushi Matsushita, Utsunomiya, all of Japan

[73] Assignee: Canon Kabushiki Kaisha, Tokyo, Japan

[21] Appl. No.: 08/877,311

[22] Filed: Jun. 17, 1997

[30] Foreign Application Priority Data

Jun. 19, 1996 [JP] Japan .................................. 8-158174

[51] Int. Cl.⁶ .................................................. G01B 9/02
[52] U.S. Cl. .............................................. 356/359; 356/360
[58] Field of Search ..................................... 356/359, 360

[56] References Cited

U.S. PATENT DOCUMENTS 5,004,346  4/1991  Kühel ...................................... 356/360
5,625,454  4/1997  Huang et al. ............................ 356/359

*Primary Examiner*—Robert H. Kim
*Assistant Examiner*—Tu T. Nguyen
*Attorney, Agent, or Firm*—Fitzpatrick, Cella, Harper & Scinto

[57] ABSTRACT

A method of measuring a lens comprises an aligning step of relatively aligning a plurality of specified annular zones on a surface of the lens with predetermined positions, and a determining step of determining an aspherical axis of the target surface aligned in the aligning step.

18 Claims, 9 Drawing Sheets

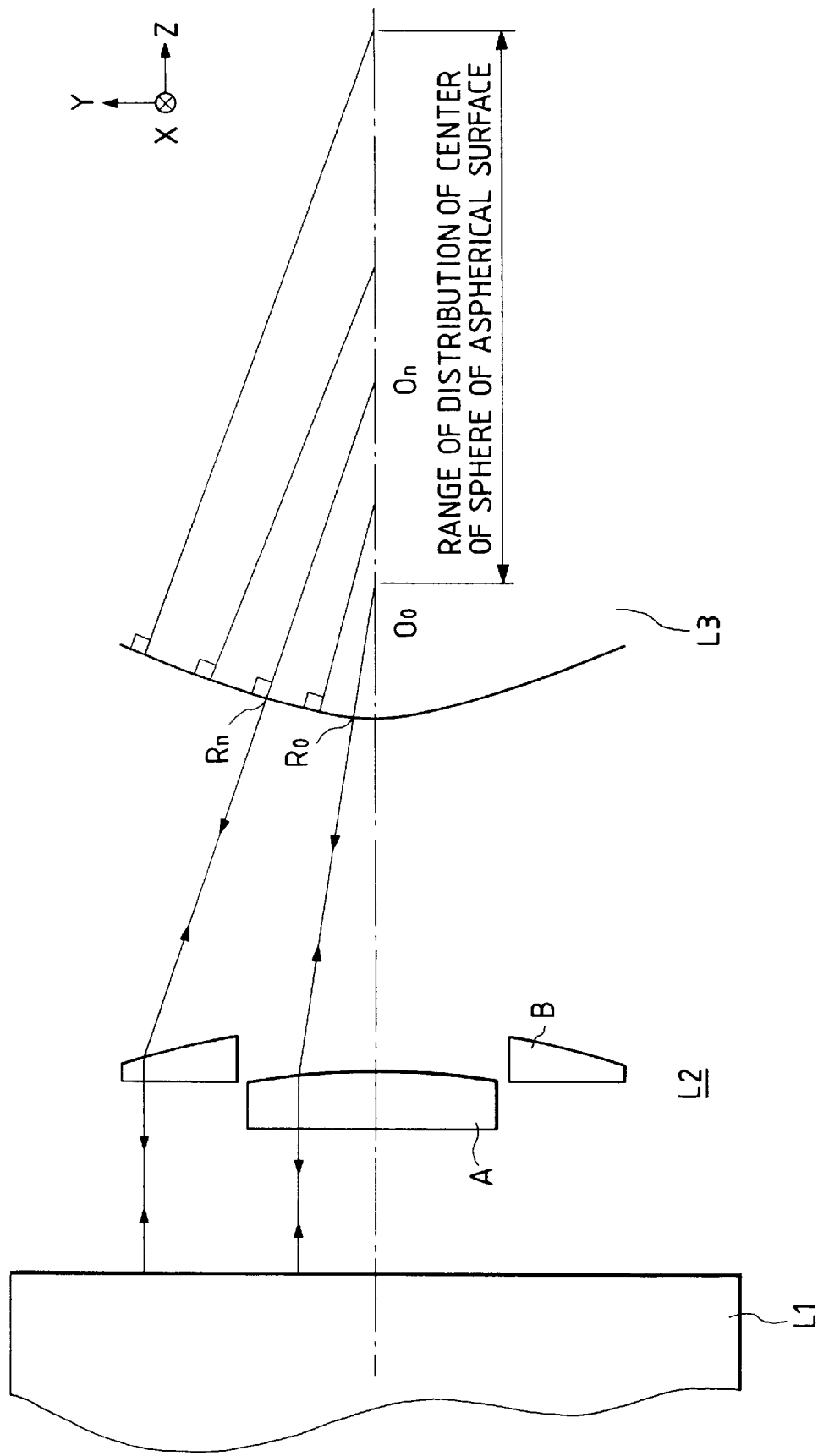

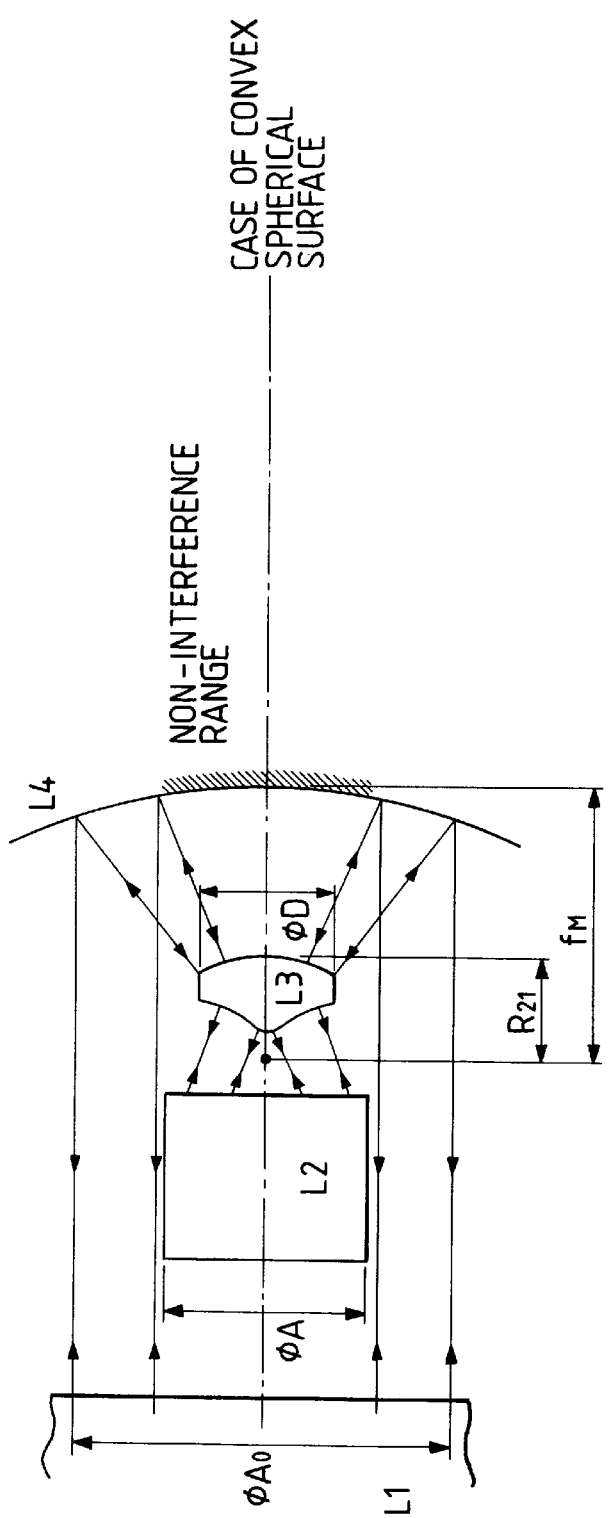
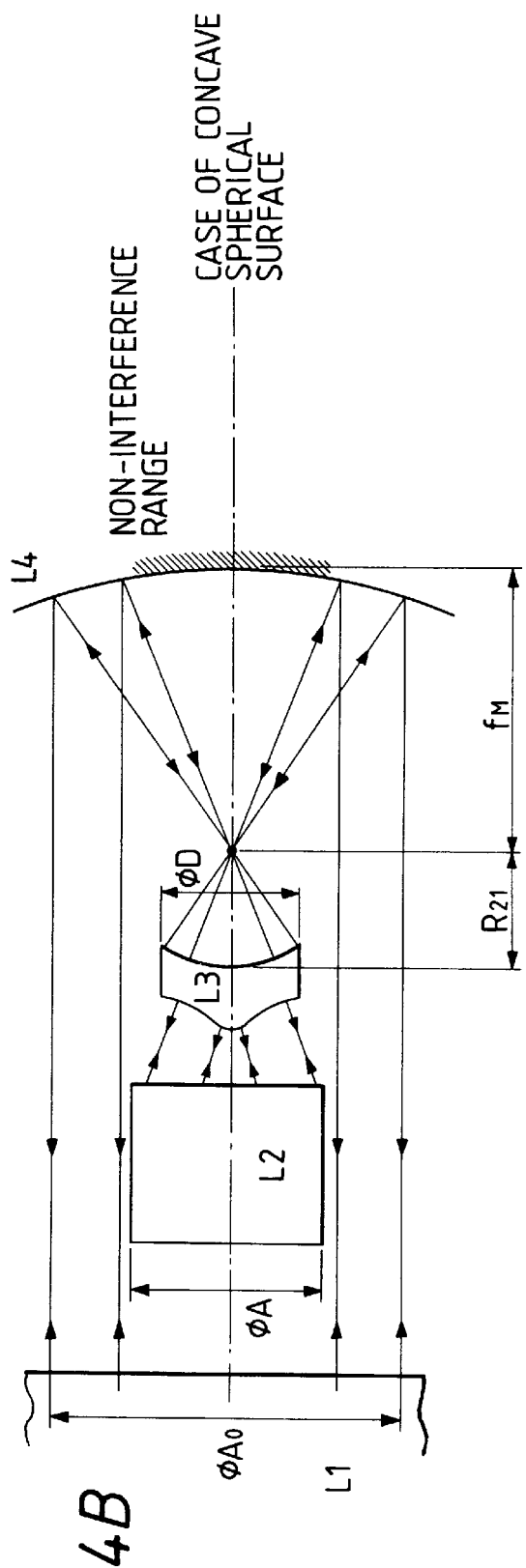
FIG. 4A
FIG. 4B

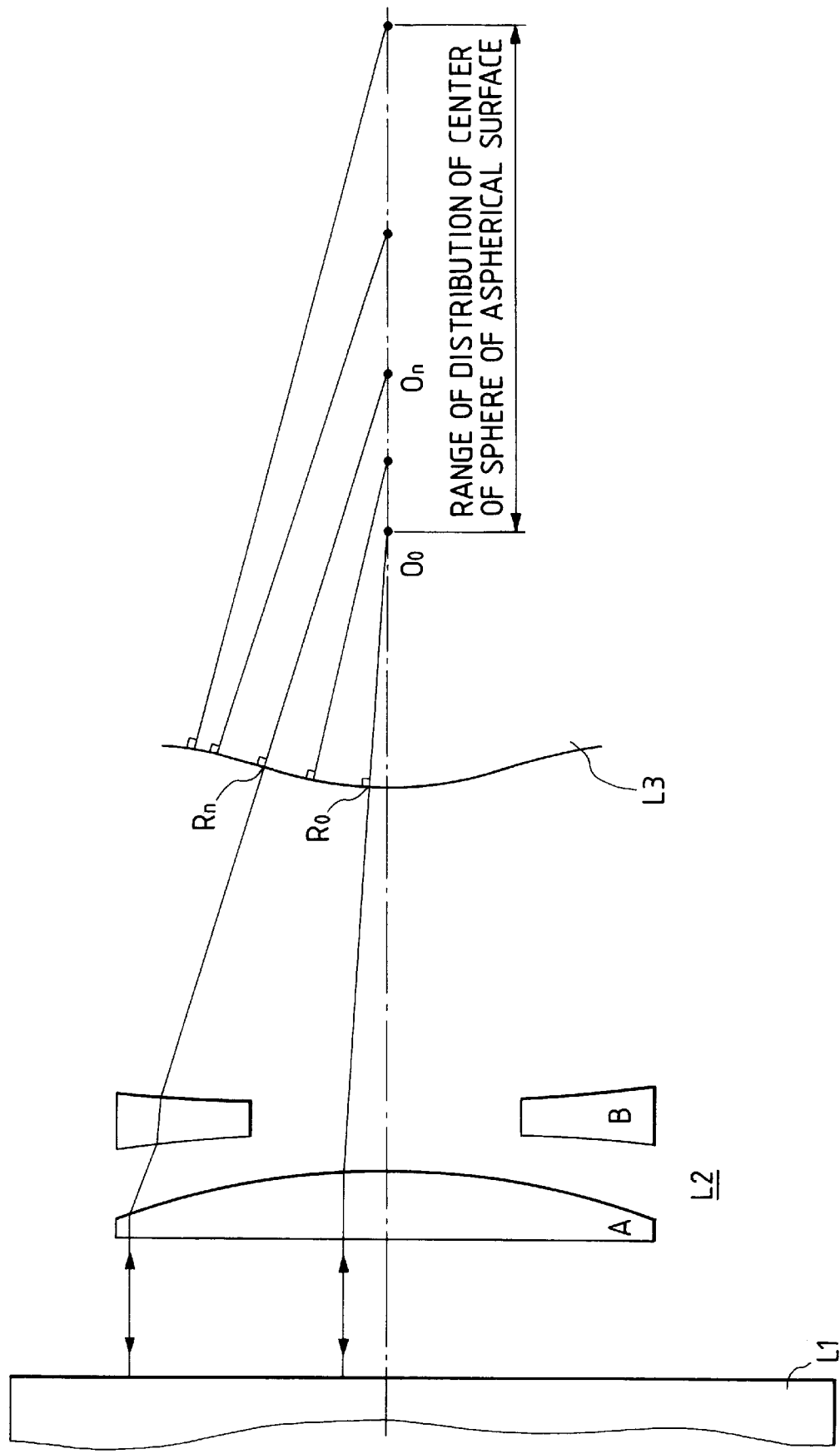

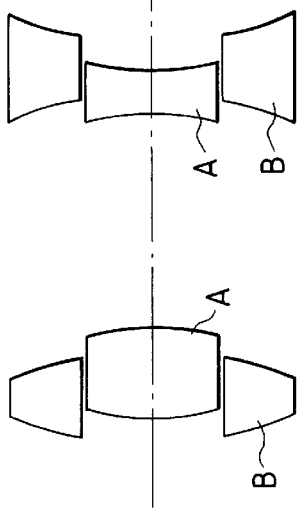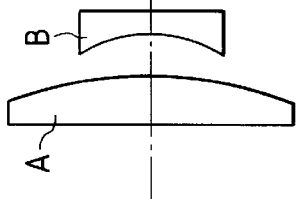

MEASURING METHOD AND MEASURING APPARATUS

BACKGROUND OF THE INVENTION

1. Field of the Invention

The present invention relates to a method of measuring an eccentricity of an aspherical lens, etc., and a measuring apparatus for determining an axis of an aspherical surface.

2. Related Background Art

Known conventional art measuring apparatuses for measuring an eccentricity of an one-sided aspherical surface are disclosed in Japanese Patent Laid-Open Application Nos. 3-115944, 5-196540 and 7-128188. Each of those apparatuses is based on a method in which a spherical surface of a lens is set as an abutting measurement reference surface, a spherical center of the spherical surface is made coincident with an axis of a separate rotary holder, thereafter a rotation thereof is made, deviation quantities in a thrust direction, a virtual spherical center direction and an outside diametrical direction are measured, and the eccentricity is estimated from those deviation quantities.

The above measuring method has, however, an error in principle. At first, the error is derived from the fact that the conventional art method utilizes a spherical aligning property of the opposite spherical surface in terms of the principle. Namely, an aligning reference when measuring the aspherical surface is set on the spherical surface, and hence the conventional art method has the following factors for causing the error.

For instance, Japanese Patent Laid-Open Application No. 5-196540 has such a construction that the lens is aligned along the opposite spherical surface (i.e., on the basis of the spherical center of the opposite spherical surface) so as not to move a chart image projected during the rotation of the lens, and an eccentric quantity is measured by detecting how much the spherical surface is displaced in an optical-axis direction parallel with a displacement meter when rotated by 180 degrees while following after the surface in that way. In a case such as treating an eccentric lens as shown in FIG. 1, wherein a spherical center Or2 of a spherical surface S2 does not exist on an aspherical axis A1 of an aspherical surface S1, however, even when rotated by 180 degrees about a pseudo optical axis A2 connecting a paraxial curvature center Oa1 of the aspherical surface S1 to a spherical center Or2 of the spherical surface S2, it never happens that the aspherical surface takes absolutely the same surface configuration disposition as the surface configuration before the rotation. That is, a deviation between the aspherical axis A1 and the spherical center Or2 can not be corrected by the rotation according to the spherical surface, and therefore the surface configuration disposition on the aspherical surface when rotated by 180 degrees is not absolutely coincident with the surface configuration disposition before the rotation. Hence, even when following after the surface so as not to move the chart image, the surface configuration disposition on the aspherical surface when rotated by 180 degrees can be just approximately closest to the surface configuration disposition before being rotated. Speaking of the control performed so as not to move the chart image, this does not mean that the control can be done strictly with no movement. There resultantly remains an error.

Further, in the Japanese Patent Laid-Open Application Nos. 7-128188 and 3-115944, the same error is caused for the reason of setting the pseudo optical axis A2 as a measuring basis, and, therefore, the precise measurement can not be performed in terms of principle. The following is a description of this problem with reference to FIG. 1.

Even if the aspherical axis A1 is aligned with the axis A2, defined as a rotary axis, by the conventional art method, it is impossible to correct the deviation between the spherical center Or2 and the aspherical axis A1 simply by the rotation according to the spherical surface as described above with respect to a tested body having an eccentricity. Therefore, there must invariably remain an angular deviation of an angle θ1 between the aspherical axis A1 and the rotary axis A2 passing through the spherical center Or2. Accordingly, the aspherical axis A1 might be tilted when setting A2 as a rotary axis. Hence, it follows that an actual measuring portion is not an annular zone of a curvature Ra1 and a curvature center Oa1 on the paraxial side but an annular zone of a curvature Ra2 and a curvature center Or2. The curvature of the annular zone is changed on the aspherical surface, and hence it follows that an apparent deviation angle θ2 attributed to a curvature difference of the annular zone of the measuring portion is formed as an error, excluding a deviation angle of an eccentric angle θ1 defined by the conventional art measuring method in that case. As far as the lens adjusting according to the spherical surface S2 is performed, the deviation described above can not be completely prevented in principle. Since A2 is set as the rotary axis, it is impossible to distinguish a deviation caused by the eccentricity from a deviation by variations in the curvature even when detecting peripheral deviations. The distinction becomes harder as an aspherical degree gets larger and as the eccentricity becomes larger. Hence, the rotary axis can not be approximately coincident with the aspherical axis in the adjustment based on this method.

In addition to the error factors described above, the measurement depending on the lens adjustment while displacing the spherical surface on the opposite side as a mechanical contact basis, contains a good number of error factors directly related to an accuracy for measuring the eccentricity, such as floating due to permeation of minute dusts, as well as a working precision of a spherical surface receiving portion of a lens holder.

Further, the biggest defect inherent in the conventional art methods is that both-sided aspherical surfaces can not be measured.

SUMMARY OF THE INVENTION

It is a primary object of the present invention to provide a measuring method and a measuring apparatus that are capable of measuring a lens eccentricity without any error in principle irrespective of a both-sided aspherical surface lens, an one-sided aspherical surface lens and a both-sided spherical surface lens, and a measuring method and a measuring apparatus that are capable of easily actualizing the above-mentioned, method and apparatus and therefore, also capable of easily determining an aspherical axis of the aspherical surface without any error in principle.

Other objects of the present invention will become apparent during the detailed discussion of the embodiments which follow.

BRIEF DESCRIPTION OF THE DRAWINGS

FIG. 3 is an explanatory view showing a specific construction of an aspherical wave generating optical system L2;

FIGS. 4A and 4B are explanatory views showing conditions of a concave mirror;

FIG. 5 is an explanatory view illustrating an example of modification of construction of the aspherical wave generating optical system L2;

FIGS. 6A, 6B, 6C, 6D, 6E, 6F, 6G and 6H are explanatory views each showing an example of modification of the aspherical wave generating optical system L2;

DESCRIPTION OF THE PREFERRED EMBODIMENTS

Figure 2:
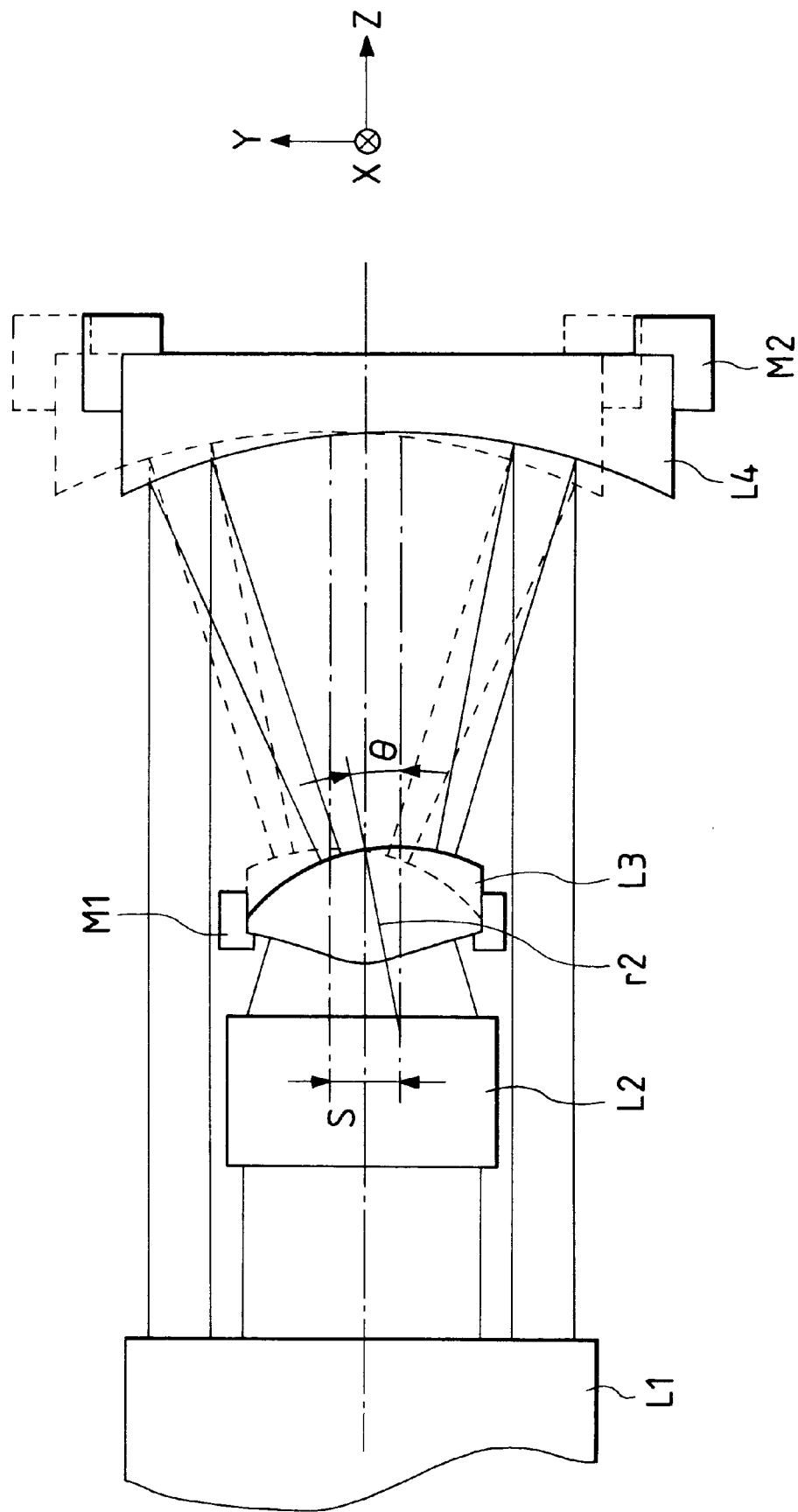
FIG. 2 is a view schematically illustrating a construction of a measuring apparatus in a first embodiment of the present invention.

FIG. 2 is a schematic diagram illustrating a construction of a measuring apparatus in a first embodiment of the present invention. Given hereinafter is an explanation of a case where the first embodiment is applied to a measurement of an one-sided aspherical surface lens.

The reference symbol L1 in FIG. 2 represents a light beam exit window of a Fizeau phase measuring interferometer. The construction of the Fizeau interferometer itself is well known, and therefore its explanation and illustration are omitted.

Shown therein are an aspherical surface wave generating optical system L2 for catching an axis of the aspherical lens surface, an aspherical L3, a concave mirror L4, a fitting jig M1 for fitting the aspherical lens L3, and a fitting jig M2 for fitting the concave mirror L4. The fitting jigs M1, M2 are controllable to move in triaxial directions (X- Y- and Z-axial directions). The fitting jig M1 is also controllable in terms of an inclination (in a θ-direction), excluding displacement in these triaxial directions independently thereof. Further, the aspherical surface wave generating optical system L2 is also constructed so that the inclination can be controlled. Moreover, the aspherical surface wave generating optical system L2 can be refitted to an optical system in a different form, corresponding to a configuration of the lens to be measured.

The measuring apparatus in the first embodiment directly measures a positional relationship optically by simultaneously interfering both surfaces of the lens with a coherent fiducial surface. In FIG. 2, the left side of the lens L3 is an aspherical surface, and the opposite surface is a spherical surface.

The unillustrated Fizeau interferometer is provided internally with a reference plane for generating a reference plane wave. Coherent plane waves are generated from the exit window L1 of the interferometer, and marginal light beams among these coherent plane waves are reflected by the concave mirror L4 and thus converted into spherical waves. The spherical waves are then incident upon the spherical surface of the lens. The light beams reflected from the spherical surface travel back directly along the incident light path and interfered with the reflected light beams from the reference surface within the Fizeau interferometer, thereby forming interference fringes.

On the other hand, the inside light beams among the coherent plane waves from the exit window L1 of the interferometer pass through the aspherical wave generating optical system L2 and become aspherical waves including spherical wave surfaces with curvatures respectively adapted to curvatures of at least two annular zones of the aspherical surface of the lens L3. The aspherical waves are then incident upon the aspherical surface side of the lens L3. As will be explained latter on, only the reflected light beams from the annular zones substantially becoming measuring targets among the reflected light beams from the aspherical surface, travel back directly along the incident light path and interfere with the reflected light beams from the reference plane inwardly of the Fizeau interferometer, thereby forming the interference fringes.

When observing the interference fringes, an optical layout is made so that, for instance, the interference fringes by the reflected light beams from the spherical surface are formed outside, and the interference fringes by the reflected light beams from the aspherical surface are formed inside on the unillustrated observation plane. With this optical layout, conditions of the interferences through the respective surfaces are observable owing to the states where the outside and inside interference fringes are formed on the observing plane.

FIG. 3 is an explanatory diagram showing a specific construction of the aspherical wave generating optical system L2. FIG. 3 shows a case where an aspherical axis of the aspherical surface of the lens L3 is coincident with the optical axis of the aspherical wave generating optical system L2. The aspherical wave generating optical system L2 is constructed of a lens A disposed in the vicinity of the optical axis, and a holed lens B disposed along the periphery of the lens A.

Plane waves incident upon the lens A are converted into spherical waves formed by light beams perpendicularly incident on only an annular zone R0 with a curvature center $O_0$ (i.e., the light beams traveling toward the curvature center $O_0$) existing in the vicinity of the optical axis of the aspherical surface. With respect to these spherical waves, only the light beams incident on the annular zone R0 completely travel back along the light path and interfere with the reference light beams within the Fizeau interferometer when considering a reflecting direction and a coherent distance.

On the other hand, the plane surface waves incident on the holed lens B are converted into spherical waves formed by light beams perpendicularly incident on only an annular zone Rn with a curvature center On (viz., the light beams traveling toward the curvature center On) existing apart from the optical axis of the aspherical surface. With respect to these spherical waves, only the light beams incident on the annular zone Rn completely travel back along the light path and interfere with the reference light beams within the Fizeau interferometer when considering a reflecting direction and a coherent distance.

Thus, the aspherical wave generating optical system L2 generates the spherical waves corresponding to the respective curvature radii of the annular zones on the inside and outside in the radial direction on the unillustrated observation plane. The aspherical waves corresponding to the configurations of the aspherical surface are thereby formed in a pseudo-manner.

The two ring-like interference fringes generating areas are formed corresponding to the respective annular zones on the inside and outside in the radial direction on the unillustrated observation plane. In this case, the aspherical axis of the aspherical surface is completely coincident with the optical axis of the aspherical surface wave generating optical system L2, and the positions in a Z-direction are well aligned. If set in this way, the interference fringes are concentrically formed in the respective areas. In this case, a pitch of the interference fringes is wide in the central zone (one color) but narrow on more internal and external peripheral sides of the central zone.

Herein, if the lens L3 is displaced in the Z-direction, the pitch of the interference fringes is narrowed on the whole. Further, if the aspherical axis is eccentric from the optical axis of the aspherical surface wave generating optical system L2, there must be caused a bias in the interference fringes that have been concentric. Moreover, when the above displacement and inclination are enlarged, the interference areas absolutely disappear due to the deviation of the light beams in the reflecting direction and a decrease in the coherency with the reference light beams. This is paradoxically utilized in this embodiment, wherein if the interferometer aligns the lens L3 with the aspherical wave generating optical system L2 so that two groups of interference fringes formed in the ring-like shape become concentric (one color) with a wide pitch of the central zone, and resultantly the aspherical axis of the aspherical surface can be coincident with the optical axis of the aspherical wave generating optical system L2. Hence, the aspherical axis can be determined.

Figure 1:
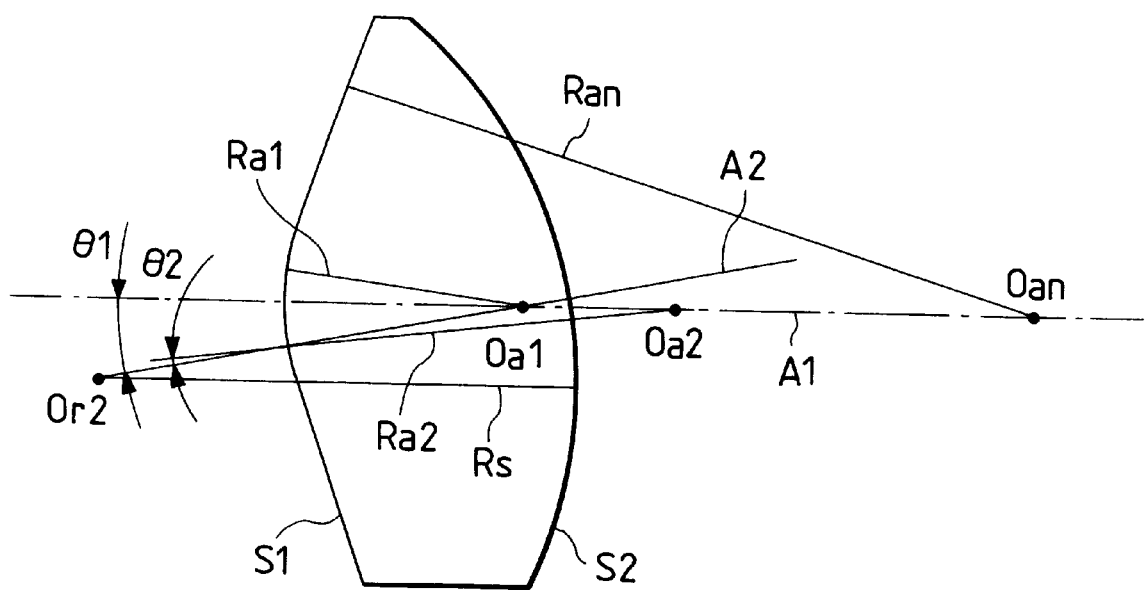
FIG. 1 is an explanatory view showing an eccentricity of an one-sided aspherical lens.

More specifically, referring to FIG. 1, when two positions Oa1, Oan spaced away from each other on the axis A1 are fixed, a position of the axis A1 is determined. In the above process, spherical centers Oa1, Oan are located in predetermined positions on the optical axis of the aspherical wave generating optical system L2, whereby the aspherical axis A1 on which the spherical centers Oa1, Oan exist is defined on the optical axis of the aspherical wave generating optical system L2. The spherical centers Oa1, Oan are set in the two positions spaced away from each other in the example given above. If the annular zones with the spherical centers Oa1, Oan are proximal to each other, however, the aspherical axis A1 can be also defined by a consecutive settling process in a range between Oa1 and Oan.

Referring back to FIG. 2, specific measuring procedures are explained.

To start with, the lens L3 to be measured is attached to the fitting jig M1. Thereafter, the aspherical wave generating optical system L2 is aligned to the fitting jig M1 by adjusting respective positions and inclinations of the aspherical wave generating optical system L2 and the fitting jig M1 so that the interference fringes are shaped in one color while observing a forming state of the interference fringes on the observation plane.

On this occasion, the optical axis of the aspherical wave generating optical system L2 must be disposed somewhat perpendicularly to the interference plane waves outgoing from the exit window L1 of the interferometer. This process is, however, inevitably done during the adjusting operation of the aspherical wave generating optical system L2. The reason is that if the optical axis of the aspherical wave generating optical system L2 is not perpendicular to the plane waves, a coma appears on an evaluation wave surface no matter how repetitive the adjusting operation may be, and the interference fringes can not be adjusted to one color on the observation plane. In other words, if adjusted to one color on the observation plane, it is assured that the optical axis of the aspherical wave generating optical system L2 is coincident with the aspherical axis and is perpendicular to the interference plane waves emerging from the exit window L1 of the interferometer.

The perpendicularity must be obtained by, as described above, making a tilt adjustment of the aspherical wave generating optical system L2 just when starting the first use of the aspherical wave generating optical system L2. Once it has been done, however, its necessity never arises thereafter even when replacing the lens.

Unlike the conventional art method, the optical axis of the aspherical surface must be caught on the interference wave surface in accordance with the first embodiment, and hence no error excluding the matching accuracy is caused. Besides, a matching accuracy is, with an one-color wavelength level being normally possible, under 0.15 μm, which accuracy is 10 times as high as that in the conventional estimation of deviation.

After completing the aspherical surface matching operation, an interference measuring operation on the opposite spherical surface is carried out.

Herein, a condition of the concave mirror L4 used in the first embodiment will be explained with reference to FIGS. 4A and 4B. FIG. 4A shows a case of a convex spherical surface. FIG. 4B shows a case of a concave spherical surface.

Supposing that φA is a larger outside diametrical dimension of the fitting jig M1 or the aspherical surface wave generating optical system L2, there is needed a light flux width φAo larger than φA in order to measure the spherical surface on the opposite side.

The light beams traveling through the marginal portions of the fitting jig M1 and the aspherical wave generating optical system L2 and incident on the concave mirror L4, are reflected by this mirror L4 and converged toward a focal point of the concave mirror L4.

A spherical center of the opposite spherical surface of the lens L3 is set coincident with the focal point of the mirror, and the interference fringes are obtained by leading the light beams reflected by the spherical surface again to the interferometer. For this purpose, there must be required such a relationship as $(\phi Ao/|fM|)<(D/|R21|)$ between a set of the light flux width φAo and the focal length fM (½ of the curvature radius RM of the concave mirror) of the concave mirror, and another set of the curvature radius R21 of the opposite-side spherical surface of the lens and the coherent effective diameter D of the same spherical surface. If deviated from this condition, the tested surface can not be irradiated with the light beams, and the measurement is impossible.

Assuming that the diameter of the area being measurable by the interferometer/curvature radius on the spherical side of the lens is 0.05 to 1.5, the concave mirror corresponding thereto must be prepared. Under this condition, the concave mirror having the spherical surface defined by NA=0.7 to 0.02, is used in the first embodiment.

If this condition is not met, as in the case of a len that is infinite on the spherical side and extremely large of the curvature, it is feasible to correspond thereto by using methods in second and third embodiment which will be discussed later on.

In the reversed case, the spherical aberration increases, and the interference fringes do not take one color enough to deteriorate the measuring accuracy. In this case, a parabolic surface is used as a concave mirror.

Referring back to FIG. 2, procedures of measuring the interference of the concave mirror L4 will be explained.

A position of the concave mirror L4 is controlled by moving the fitting jig M2 while seeing a state of the interference of the peripheral portion on the observation surface. If the interference fringes formed by the reflected light beams from the spherical surface can be set in the one-color state (where the interval of the interference fringes produced becomes substantially infinite, i.e., where no fringes are formed) together with the interference fringes on the aspherical surface previously matched, this implies that the original point can be obtained.

Next, the lens L3 is rotated through 180 degrees in the radial direction in the fitting jig M1, and thus refitted.

If the aspherical axis of the lens is tilted relative to the outside diameter, and, if non-eccentric, parallel with as well, no change must be seen in the interference state on the side of the aspherical surface on the observation plane.

If changed, the fitting jig M1 is slanted, and an X-Y adjustment is carried out to get the first one-color state regenerated. The eccentricity to the outside diameter is ½ of a slant adjusting quantity (an adjusting angle) of the fitting jig M1 moved at that time, and the parallel eccentricity to the outside diameter is ½ of a synthetic vector of the X-Y adjusting quantity.

If the one-color state is regenerated, this implies that the aspherical axis of the aspherical surface is again defined on the interference wave surface. Herein, however, if the spherical center of the opposite-side spherical surface is non-eccentric so as to exist on the aspherical axis, the state of the interference by the reflected light beams from the opposite surface leads to the regeneration of the state (one-color state) before being re-fitted.

If there is eccentricity between the aspherical surface and the spherical surface, and if the state of the interference by the reflected light beams from the spherical surface is not yet regenerated, the concave mirror L4 is adjusted in the X-Y direction by moving the fitting jig M2, thereby regenerating the one-color state before being re-fitted.

A parallel eccentric quantity S of the spherical center of the opposite-side spherical surface with respect to the aspherical axis is ½ of the synthetic vector of the X-Y adjusting quantity moved at that moment.

The axis can be conceived as a line segment in terms of the relationship between the above-described aspherical axis and the outside diameter, and hence the tilt is required to be taken into consideration. However, the spherical center is defined as a point and may not be therefore taken into consideration.

A deviation θ between the aspherical axis and the optical axis of the spherical surface can be also obtained from the parallel eccentric quantity S on the basis of the following formula (1):

$$\theta = \operatorname{Sin}^{-1}(S/r2) \quad (1)$$

where

S: the parallel eccentric quantity, and r2: the curvature radius of the opposite surface.

In accordance with the first embodiment, the aspherical surface wave generating optical system L2 is separated into the holed lens B and the central portion lens A, and the mutual positions thereof are shifted in the optical-axis direction, thereby attaining the generation of the desired pseudo aspherical waves.

FIG. 5 shows an example of modification of construction of the aspherical wave generating optical system L2. In this construction, the lens A has an enlarged diameter, the spherical waves for the annular zone Rn are generated by the synthetic system consisting of the lens A and the holed lens B. In FIG. 5, the lens A is convex, while the lens B is concave, and vice versa depending on the tested surface. Further, the lens B may be formed not as the holed lens but as a suspending lens of a system having a size of the hole.

FIGS. 6A to 6H illustrate examples of the variant forms of the lens combination of the aspherical wave generating optical system L2.

Further, the aspherical wave generating optical system L2 is replaced with another one when changing the pseudo aspherical waves in the first embodiment. The pseudo aspherical waves may, however, be varied by changing the layout and the interval between the lens A and the lens B of the single aspherical wave generating optical system L2.

Figure 7:
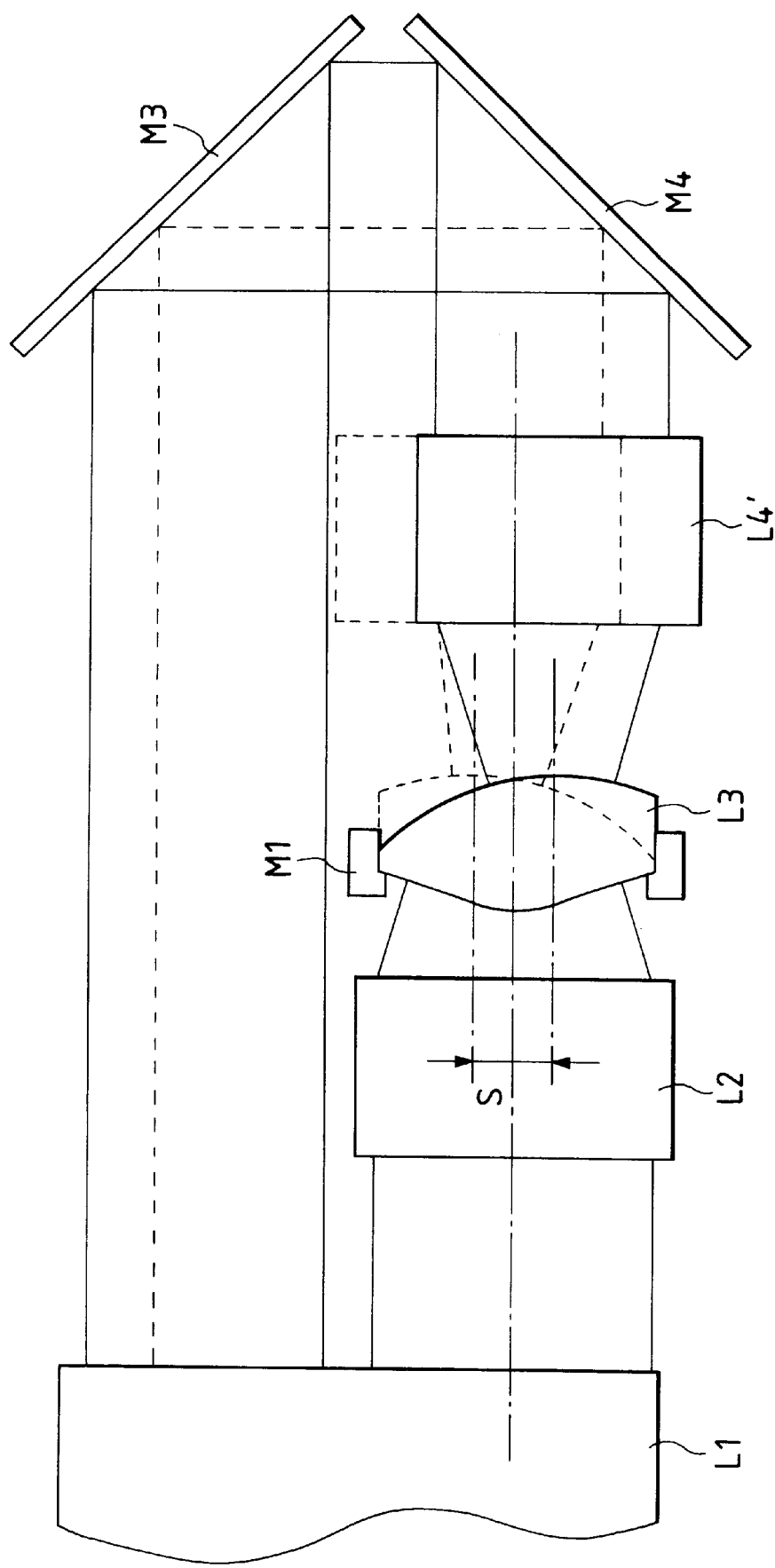
FIG. 7 is a schematic view showing a construction of the measuring apparatus in a second embodiment of the present invention.

FIG. 7 is a view schematically illustrating a construction of the measuring apparatus in a second embodiment of the present invention. The same members as those shown above are marked with the like numerals, and explanations thereof are omitted.

The measuring apparatus in the second embodiment uses one interferometer for measuring the eccentricity of a both-sided aspherical lens.

The following are different arrangements from the first embodiment. The dispositions of the lens L3 and members L2, M1 concomitant therewith are shifted in parallel downwardly of the center of the plane waves emerging from the exit window L1 of the interferometer. Plane reflecting mirrors M3, M4 disposed slanting at 90 degrees to each other, are provided instead of the concave mirror L4. Provided also is an aspherical surface wave generating optical system L4' that is the same as the optical system L2. The light beams incident upon the right-side aspherical surface travel along the light path deflected back by those optical members. In this case, a ring-like interference zone is produced by the light beams reflected from the right-side aspherical surface, adjacent to a ring-like interference zone formed by the light beams reflected from the left-side aspherical surface on the observation plane.

In advance of starting the measurement, the slants of the mirrors M3, M4 are adjusted in a state where the optical members L2, L3, L4' do not exist, so that the interference fringes take the one-color state on the observation plane.

By this adjustment, the light beams incident upon the respective surfaces each split into two segments in the drawing can be collimated into the light beams parallel with each other.

Next, the aspherical wave generating optical system L2 and the lens L3 are adjusted to assume the one-color state in the procedures described in the first embodiment. Thereafter, the aspherical surface on the opposite side is also similarly adjusted to take the one-color state on the observation plane by moving only the aspherical surface wave generating optical system L4'. On this occasion, if there might be a relative tilt between the aspherical axes of the two aspherical surfaces, the aspherical surface wave generating optical system L4' must be tilted corresponding to the lens L3. If tilted, however, the interference light beams are not perpendicular to the aspherical wave generating optical system L4', and therefore the one-color interference adjusting operation can not be performed in that state.

Such being the case, the interference adjusting operation entails correcting the slant of the mirror M4 or M3.

The X-Y directional parallelism and slant of the aspherical surface wave generating optical system L4' are adjusted while keeping the state where the light beams are incident perpendicularly upon the aspherical wave generating optical system L4' by adjusting the slant of the mirror M4 or M3, whereby the one-color adjustment is made.

An amount of twice of fold slant correction of the mirror tilted at that time corresponds to an amount of a relative tilt between the aspherical axes of the two aspherical surfaces.

Furthermore, a position and an angle of the fitting jig M1 are controlled by rotating the lens L3 by 180 degrees without moving the aspherical surface wave generating optical system L2, thus performing the one-color adjustment. Thereafter, the aspherical wave generating optical system L4' is moved in the X-Y direction, thus executing the one-color adjustment. Herein, unlike the first embodiment, the two surfaces are all apspherical, and hence ½ of the synthetic vector of the X-Y adjusting quantity obtained by moving the aspherical wave generating optical system L4' is not just the relative parallel eccentricity itself of the aspherical axis.

Figure 8A:
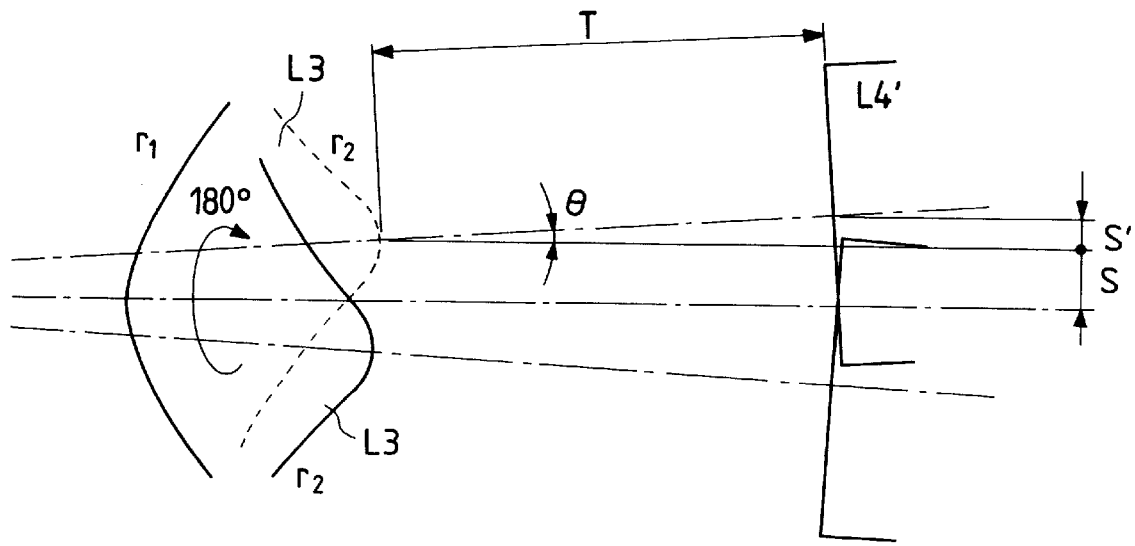
FIGS. 8A and 8B are explanatory views showing a parallel eccentricity.
Figure 8B:
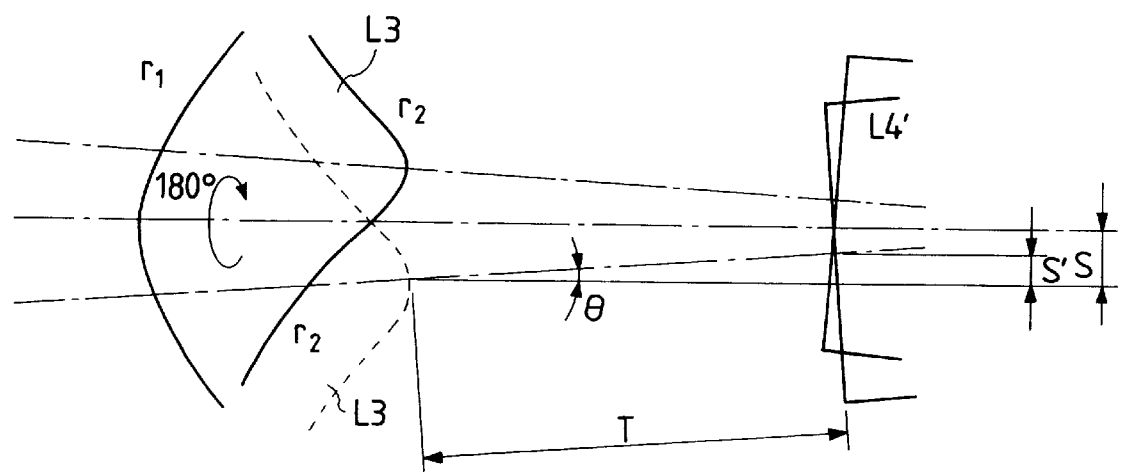

The reason for this will be explained referring to FIGS. 8A and 8B. FIG. 8A shows a case in which the right-side aspherical axis is tilted toward the outside with respect to the left-side aspherical axis. FIG. 8B shows a case reversed to the above-mentioned. In any case, the explanation will be made based on the case where the aspherical surface changed from a state indicated by a solid line to that of a broken line.

A parallel eccentricity of the aspherical wave generating optical system L4' is given by S'=Sinθ·T, where θ is the angle at which the aspherical wave generating optical system L4' is tilted, and T is the distance between the aspherical surface and the aspherical wave generating optical system L4'. This parallel eccentricity is synthesized with the parallel adjusting quantity of the apspherical wave generating optical system L4' and thus counted. Accordingly, this value must be taken into consideration from an actually measured parallel eccentric quantity of the aspherical wave generating optical system L4'. In the case of FIG. 8A, a value of Sinθ·T must be subtracted from the actually measured parallel eccentric quantity. Reversely, in the case of FIG. 8B, the value of Sinθ·T must be added to the actually measured parallel eccentric quantity.

As shown in FIGS. 8A and 8B, there must be a necessity for ascertaining whether the aspherical axis of an opposite-side aspherical surface r2 is tilted outward or inward with respect to the aspherical axis of a reference aspherical surface r1, and whether the two axes are, though not illustrated in FIGS. 8A and 8B, are not on the same plane but twisted or synthesized. These states can be judged from variations in the actually measured parallel eccentric quantity as well from the title adjusting direction when the fitting direction is changed 180 degrees.

If twisted, the parallel eccentric quantity to be corrected is arithmetically obtained by decomposing it into a vector quantity with respect to the reference aspherical axis.

Figure 9:
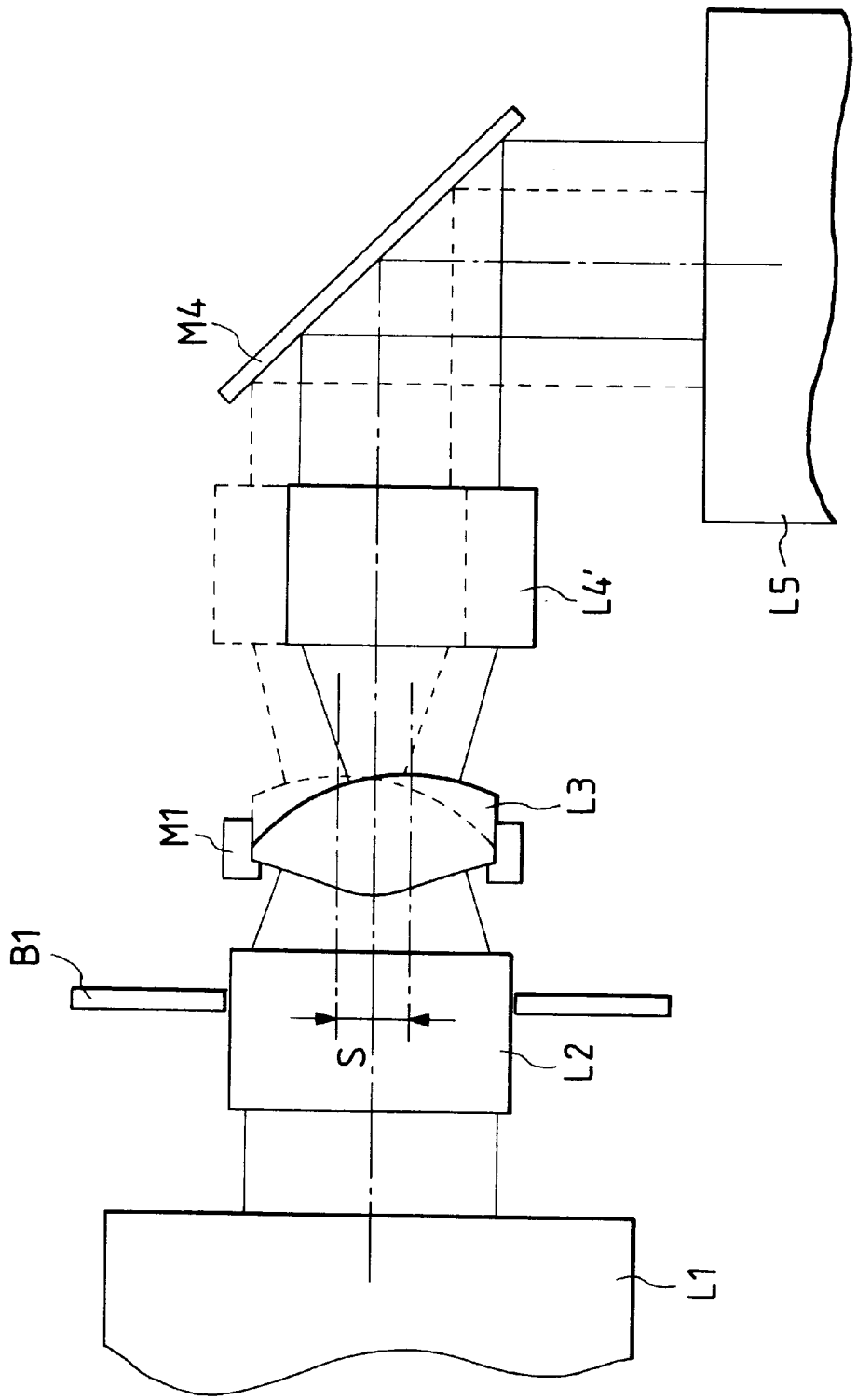
FIG. 9 is a schematic view showing a construction of the measuring apparatus in a third embodiment of the present invention.

FIG. 9 is a view schematically showing a construction of the measuring apparatus in a third embodiment of the present invention.

The third embodiment, unlike the second embodiment, is constructed to use two interferometers for measuring the respective surfaces. That is, there is provided another interferometer for forming the light beams made incident on the lens L3. Plane waves from an exit window L5 of this interferometer are incident on the aspherical wave generating optical system L4 via the plane mirror M4 capable of adjusting the angle.

The mirror M4 is used for adjusting the angle by the same method as that in the second embodiment if the two surfaces of the lens are aspherical and there is the tilt eccentricity. This eliminates the necessity for tilting the interferometer body when effecting the one-color adjustment.

In accordance with the third embodiment, a shielding plate B1 is provided so that the plane waves which do not contribute to the interferences from the two interferometers become no causes for noises of the other interferometer.

The aspherical wave generating optical system L4' is the same optical system as the aspherical wave generating optical system L2 if the two surfaces of the lens are aspherical, but may be an optical system for generating normal spherical surface waves if spherical.

The third embodiment provides a method effective in such a case that the interference waves are hard to split.

The embodiments for measuring the lens containing the aspherical surface have been discussed so far. The embodiments described above are, however, effective in an application to a normal lens the two surfaces of which are spherical, wherein the method of using is the same, except for simply replacing the aspherical wave generating optical system with a spherical wave generating optical system.

The both-sided spherical lens has, however, the optical axis that the line segment connecting two curvature spherical centers serves as, and there invariably exists only one axis with no surface relative eccentricity.

Accordingly, the eccentricity of the both-sided spherical lens can be regarded as a parallel eccentricity of an opposite-surface curvature spherical center on the outside diametrical basis if one of the surfaces is set to an abutting reference surface on the basis of the outside diametrical basis.

In this case also, that can be estimated as a slant quantity by the arithmetic formula (1) given in the first embodiment, and a transmitting eccentric quantity, which is used generally, is obtained from the slant quantity by the Snell's formula.

The embodiments discussed above are effective particularly in lenses for which it is hard to evaluate a transmitting eccentric quantity using a transmitting eccentric measuring microscope currently in use with lens-rotation method, such as the both-sided spherical lens with an extremely small-diameter, with a thin edge lens, with an deformed outside-diameter, etc.

In the embodiments discussed above, a diffusion plate for a naked-eye observation and an imaging element for a monitor observation can be disposed on the unillustrated observation plane. Further, if the imaging element is disposed thereon, there may be taken such a form that an imaging signal is processed for an image analysis.

It is apparent that, in this invention, a wide range of different working modes can be formed based on the invention without deviating from the spirit and scope of the invention. This invention is not restricted by its specific working modes except as defined by the appended claims.

What is claimed is:

1. A method of measuring a lens comprising:
   an aligning step of relatively aligning a plurality of annular zones on a surface of said lens with predetermined positions; and
   a determining step of determining an aspherical axis of the surface aligned in said aligning step.

2. The method according to claim 1, further comprising:
   a rotating step of rotating said lens through an angle smaller than one rotation; and
   an eccentricity measuring step of obtaining an eccentricity of the surface from a variation in the aspherical axis of said lens when rotated through the angle smaller than one rotation in said rotating step.

3. The method according to claim 2, wherein after executing said aligning step for at least one of two surfaces of said lens, said rotating step is executed, and the eccentricity between the two surface of said lens is obtained in said eccentricity measuring step.

4. The method according to claim 2, wherein said aligning step is executed based on a condition of interference fringes formed by light beams reflected from the annular zones.

5. The method according to claim 4, wherein after said aligning step is executed for at least one of the two surfaces of said lens, said rotating step is executed, and the eccentricity between the two surfaces of said lens is obtained based on an adjusting quantity when making an optical adjustment so that the condition of the interference fringes becomes the same as that before being rotated in said eccentricity measuring step.

6. The method according to claim 5, wherein said eccentricity measuring step is executed to obtain the eccentricity between the two surfaces of said lens on the basis of the adjusting quantity of the optical adjustment carried out for one surface thereof after aligning the other surface of said lens.

7. The method according to claim 1, wherein said aligning step is executed based on the condition of the interference fringes formed by the light beams reflected from the annular zone.

8. An apparatus for measuring a lens, comprising:

an incident wave front generating optical system for generating such a wave front that light beams are simultaneously incident perpendicularly upon only a plurality of annular zones on one surface of said lens;

an interferometer for causing an interference by making the light beams reflected from the plurality of annular zones travel back along an incident light path; and a lens aligning mechanism, capable of adjusting a disposition of said lens, for aligning said lens on the basis of interference fringes formed by the light beams reflected from the plurality of annular zones.

9. The apparatus according to claim 8, wherein the surface of said lens is aspherical, and said incident wave front generating optical system separately forms such spherical surface waves that the light beams are perpendicularly incident upon each of the plurality of annular zones each having a different curvature center of the aspherical surface.

10. The apparatus according to claim 9, wherein said incident wave front generating optical system has a holed lens or a suspending lens.

11. The apparatus according to claim 8, further comprising:

a second incident wave front generating optical system for generating such a wave front that the light beams are incident upon a second surface opposite to the one surface;

a second interferometer for causing the interference of the light beams reflected from the second surface; and an optical member capable of making a disposing adjustment for shifting the light beams incident upon at least one of the two surfaces of said lens with a disposing adjustment of said lens by said lens aligning mechanism.

12. The apparatus according to claim 11, wherein said interferometer and said second interferometer have a common optical member.

13. The apparatus according to claim 11, wherein said second incident wave front generating optical system and said optical member have a common mirror.

14. The apparatus according to claim 13, wherein said mirror is a concave mirror, and said concave mirror makes the light beams traveling through an area outside said lens, incident upon the other surface.

15. The apparatus according to claim 11, wherein the second surface is also aspherical, and said second incident wave front generating optical system generates such a wave front that the light beams are incident perpendicularly upon only a plurality of annular zones on the second surface.

16. A method of measuring a lens, comprising:

a rotating step of rotating said lens through an angle smaller than one rotation;

a step of obtaining data about variations in condition of causing interference fringes formed by light from respective ones of the two surfaces of said lens; and an eccentricity measuring step of obtaining an eccentricity between the two surfaces of said lens on the basis of the variation in the condition of causing the interference fringes.

17. The method according to claim 16, wherein said eccentricity measuring step is executed to obtain the eccentricity between the two surfaces of said lens from an adjusting quantity when making an optical adjustment to compensate for the variations in the condition of causing the interference fringes after said rotating step.

18. An apparatus for measuring an eccentricity between two surfaces of a lens, comprising:

incident wave front generating means for generating such a wave front that light beams are incident upon each of two surfaces of said lens;

interfering means for causing interference by making light beams reflected from each of the two surfaces travel back along an incident light path;

lens aligning means capable of making a disposing adjustment of said lens for aligning said lens on the basis of the interference fringes formed by respective ones of the light beams reflected from the two surfaces; and light beam adjusting means capable of making a disposing adjustment for shifting the light beams incident upon at least one of the two surfaces of said lens with a disposing adjustment of said lens by said lens aligning means.

* * * * *

UNITED STATES PATENT AND TRADEMARK OFFICE
CERTIFICATE OF CORRECTION

PATENT NO. : 5,940,181
DATED : August 17, 1999
INVENTOR(S) : Issei Tsubono, et al.

It is certified that error appears in the above-identified patent and that said Letters Patent is hereby corrected as shown below:

Title page,
Item [56] References Cited - U.S. Patent Documents:
Insert -- 5,549,855    8/1996    Nakanishi et al.
5,696,621    12/1997    Nakanishi et al.

FOREIGN PATENT DOCUMENTS
7-128188    5/1995    Japan
5-196540    8/1993    Japan
3-115944    5/1991    Japan --.

Column 4,
Line 6, "latter" should read -- later --.

Column 6,
Line 54, "len" should read -- lens --.
Line 57, "embodiment" should read -- embodiments --.

Column 10,
Line 37, "an deformed" should read -- a deformed --.

Column 11,
Line 1, "surface" should read -- surfaces --.

Signed and Sealed this

Sixth Day of November, 2001

Attest:

NICHOLAS P. GODICI
*Attesting Officer*     *Acting Director of the United States Patent and Trademark Office*